Figure 1:
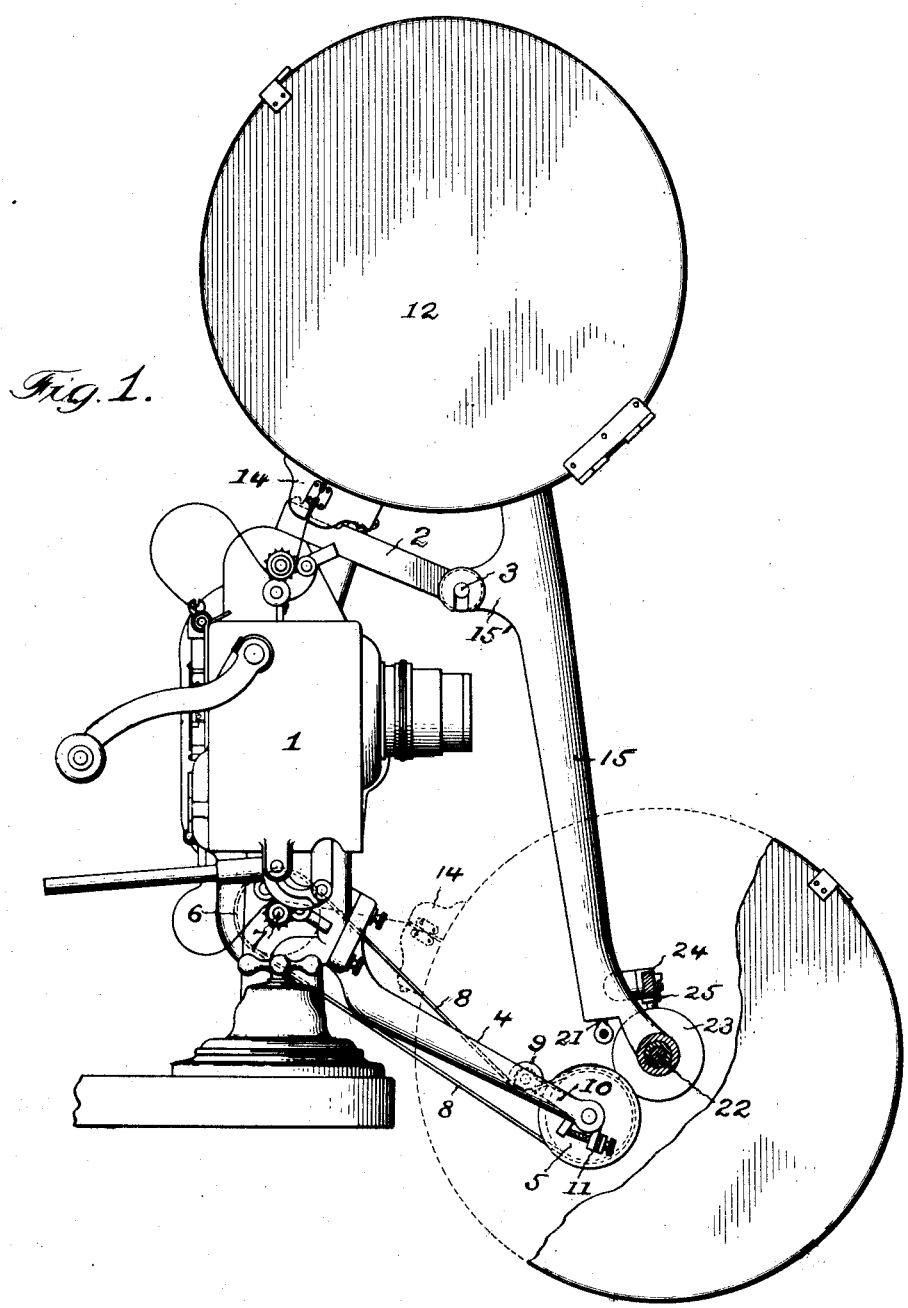

A. C. ROEBUCK.
REELING MECHANISM.
APPLICATION FILED MAY 22, 1911.

1,024,866.

Patented Apr. 30, 1912.
4 SHEETS—SHEET 1.

Attest:
Chas. H. Buell
Henry Mor.

Inventor:
Alvah C. Roebuck,
by Robert Burns Atty

A. C. ROEBUCK.
REELING MECHANISM.
APPLICATION FILED MAY 22, 1911.
1,024,866.
Patented Apr. 30, 1912.
4 SHEETS—SHEET 2.
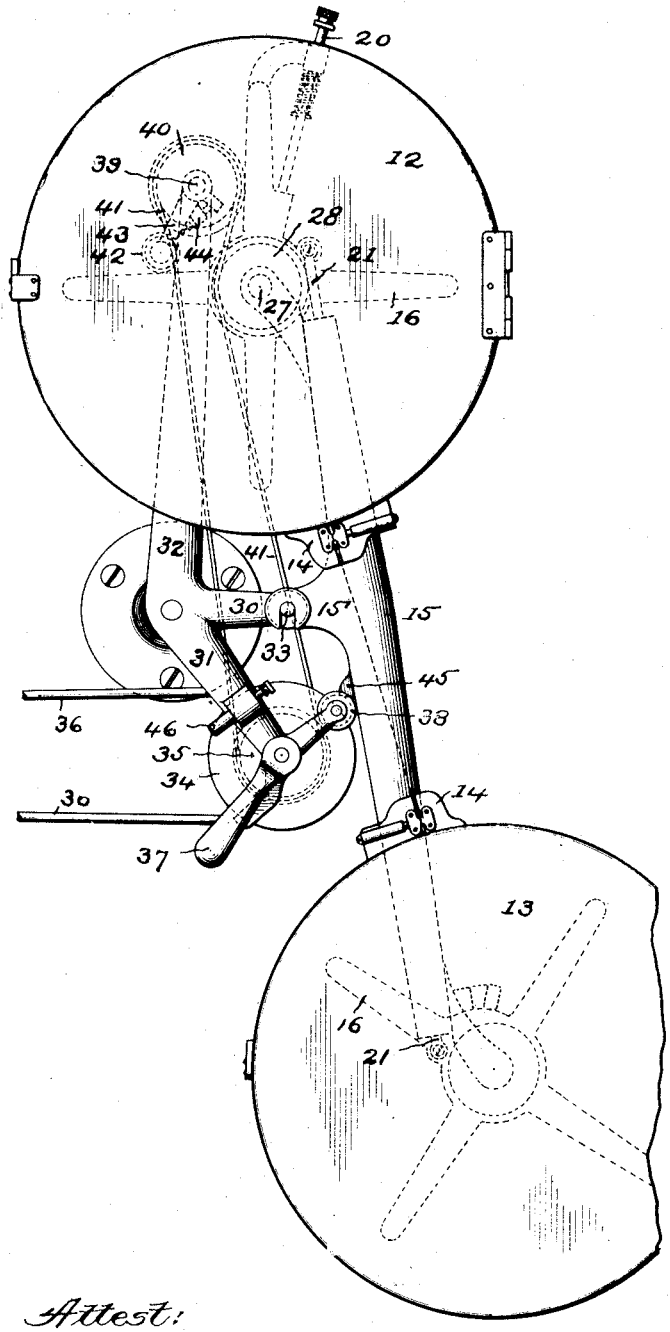
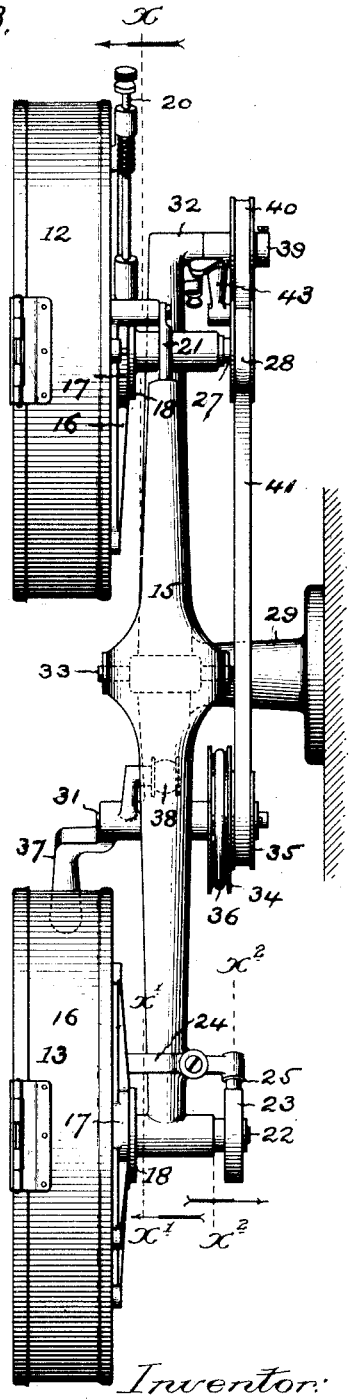
Attest:
Chas. H. Buell.
Henry Moe.
Inventor:
Alvah C. Roebuck,
by Robert Burns, Atty.

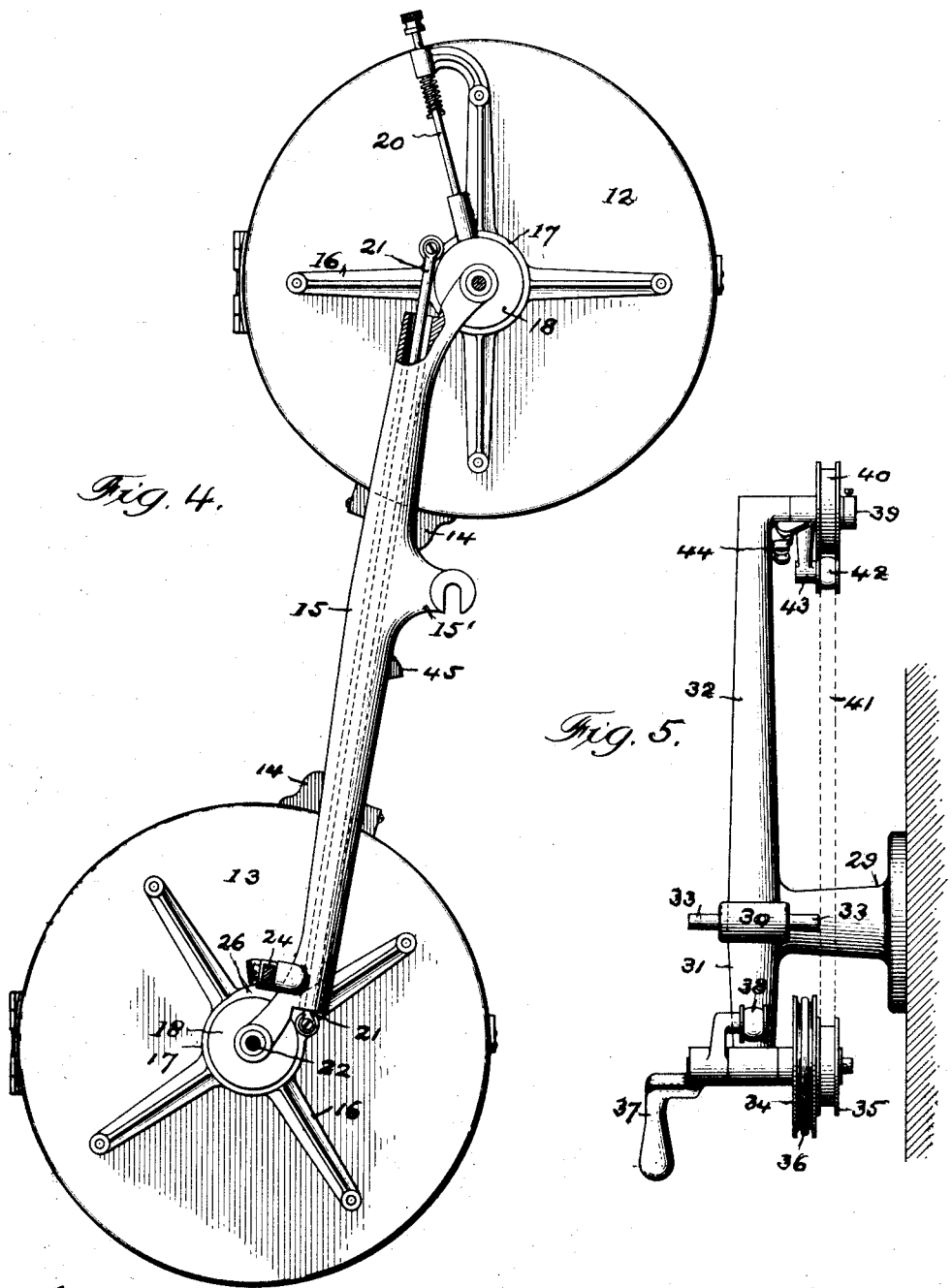

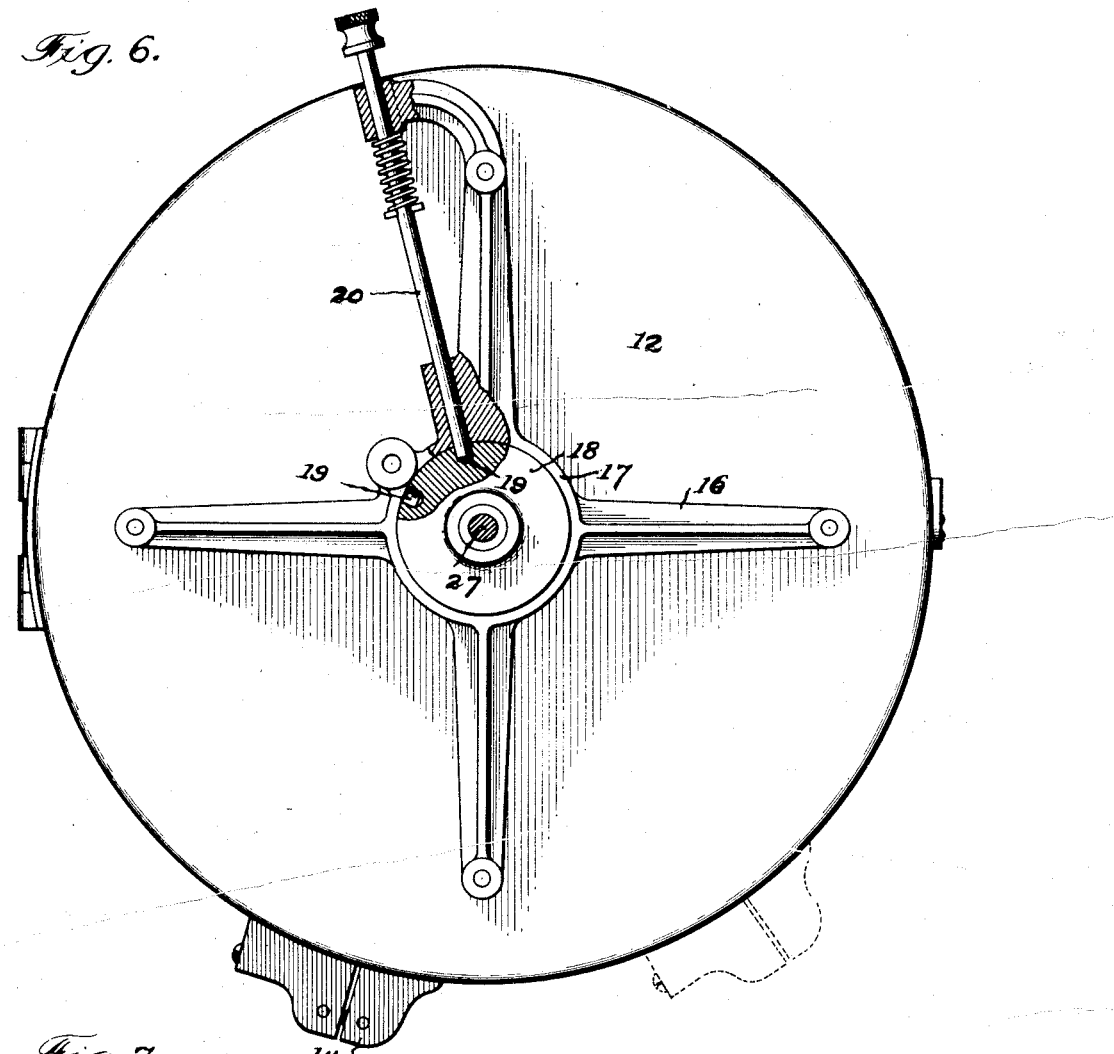
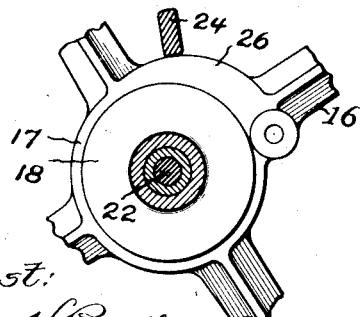
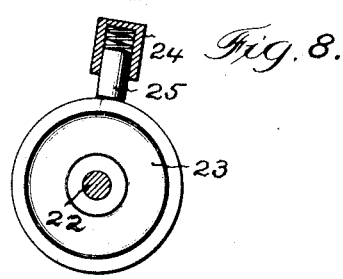

UNITED STATES PATENT OFFICE.

ALVAH C. ROEBUCK, OF CHICAGO, ILLINOIS, ASSIGNOR TO THE ENTERPRISE OPTICAL MFG. COMPANY, OF CHICAGO, ILLINOIS, A CORPORATION OF ILLINOIS.

REELING MECHANISM.

1,024,866.     Specification of Letters Patent.     Patented Apr. 30, 1912.

Application filed May 22, 1911. Serial No. 628,837.

*To all whom it may concern:*

Be it known that I, ALVAH C. ROEBUCK, a citizen of the United States of America, and a resident of Chicago, in the county of Cook, State of Illinois, have invented certain new and useful Improvements in Reeling Mechanisms, of which the following is a specification.

This invention relates to that class of reels used in connection with kinetoscopes for the convenient holding of the roll of picture film in a ready and convenient manner while the same is being passed through the feeding mechanism of the kinetoscope, and which is adapted to receive and rewind the film after its passage through said mechanism, an example of which forms the subject matter of my prior Letters Patent No. 919,773, dated April 27th, 1909. And the present improvement has for its object to provide a simple and efficient structural formation and combination of parts whereby the simultaneous rewinding of a used film can be effected at the same time that a second film is being passed through the kinetoscope to be exhibited, thus attaining a ready and quick change of service where a series of two or more standard reels usually carrying one thousand feet of film each are used for each exhibition, without the aid of the assistant operator ordinarily employed to conduct the rewinding and like operations, all as will hereinafter more fully appear.

In the accompanying drawings: Figure 1, is a side elevation, with parts of the lower film magazine broken away, and showing the connection of the present reeling mechanism to a kinetoscope, and in which the film has to travel from the delivery to the receiving magazine. Fig. 2, is a side elevation showing the connection of the present reeling mechanism to an auxiliary rewinding mechanism, and in which travel is imparted to the film from the receiving magazine to the delivery magazine, to be wound in proper order upon the reel of said delivery magazine. Fig. 3, is an end elevation of the same. Fig. 4, is an elevation of the magazines and their carrying arm, detached, and with parts in section on line $x$, Fig. 3. Fig. 5, is an end elevation of the auxiliary rewinding mechanism aforesaid, with the magazines and their carrying arm removed. Fig. 6, is an enlarged detail elevation of the upper magazine and its accessories, parts being shown in sectional elevation. Fig. 7, is a detail section on line $x'-x'$ Fig. 3. Fig. 8, is a similar view on line $x^2-x^2$, Fig. 3.

Similar numerals of reference indicate like parts in the several views.

Referring to the drawings, 1 represents the supporting frame or housing of a kinetoscope, and within which is arranged the film feeding and light controlling mechanisms usual to such apparatus.

2 is an upper bracket arm secured to the frame or housing 1 and provided at its outer or free end with a transverse stud or pin 3 for supporting engagement with the hereinafter described carrying arm of the film magazines.

4 is a lower bracket arm secured to the frame or housing 1 and provided at its outer or free end with a bearing for the shaft of a belt pulley 5, which receives rotation from a corresponding pulley 6, on one of the positively driven shafts 7 of the kinetoscope through an endless belt connection 8. The pulley 5 and belt 8 as so arranged constitute means for driving by friction the receiving reel of the lower film magazine as hereinafter more fully set forth, and in the preferred construction shown in Fig. 1, the tension of the belt 8 is maintained by a tension roller 9 carried by a radius arm 10, pivoted on the shaft of the pulley 5, and impelled by a spring 11, to impose the required tension on the belt 8, as usual in belt tensioning mechanisms.

12 and 13 are the respective upper and lower magazines or housings which inclose the respective upper or delivery, and lower or receiving film reels of the present construction, and from one to the other of which reels the roll of picture film is transferred during a kinetoscopic exhibition of the same. Each magazine is preferably of the drum shape shown, and consists of a circular rim, a fixed head at one end of said rim and a hinged head at the other end of said rim, affording free access to the interior of the magazine in the removal and replacement of its film reel as usual in the present class of reeling mechanisms. In addition each magazine will have an outlet neck 14, of the usual fire trap construction, for the passage of the film in the reeling and unreeling operations of the same.

15 is the carrying or connecting arm before referred to, and upon the respective ends of which are mounted the aforesaid film magazines 12 and 13, and their accessories. Midway its length said arm is provided with a lateral extension 15' which in turn is formed with a transverse open bottom recess adapted for detachable engagement with the aforesaid transverse stud 3 on the kinetoscope, and with a similar stud of the film rewinding mechanism hereinafter described.

16 are skeleton frames or spiders attached to the fixed heads of the magazines 12 and 13 aforesaid, and having central tubular hubs 17 that have bearing upon correspondingly formed lateral heads 18 at the respective ends of the aforesaid carrying arm 15 and adapted to be semi-revoluble thereon as shown.

19 are a pair of radial orifices formed in spaced relation in the upper head 18, of the carrying arm 15, aforesaid.

20 is a manually actuated spring latch bar moving suitable guides on the skeleton frame or spider 16 of the upper magazine 12, and having radial alined relation to the orifices 19 aforesaid, so as to have locking engagement with one or the other of the same in the attainment of the two adjustments of the magazines hereinafter set forth.

21 is a connecting rod or link pivoted at its respective ends to crank pins on the spiders 16 of the upper and lower magazines 12 and 13, and adapted to effect a simultaneous movement of the lower magazine in unison with the upper magazine as the same is shifted by hand from one position to another in actual use.

22 is the carrying shaft of the lower film reel above referred to, and which has bearing in the lower head 18 of the carrying arm 15. Said shaft extends beyond said bearing head and carries a pulley 23, which when the reeling mechanism is used in connection with a kinetoscope, is adapted to receive motion by frictional contact with the before described endless belt connection 8, and its pulley 6, to effect a gradual reeling of the roll of film within the lower magazine as the exhibition progresses. When used in connection with the film rewinding mechanism hereinafter described, said pulley is adapted to form one element of a brake mechanism by which the revolution of its reel is retarded so as to effect a tight winding of the film onto the reel of the upper magazine. The other and automatic portions of said brake mechanism comprises the following parts:—24 is a transverse lever pivoted on the aforesaid carrying arm 15, and provided at its outer end with a brake shoe 25 adapted to have bearing contact with the periphery of the aforesaid pulley 23. 26 is an incline or cam formed on the central hub 17 of the lower spider 16 aforesaid and having operative engagement with the inner end of the aforesaid brake lever 24, the construction being such that as the lower magazine is turned to its proper rewind position, said cam will automatically apply the brake shoe 25 to the pulley 23 to attain the required retardation in the rotation of the lower film reel. 27 is the carrying shaft of the upper film reel above referred to, and having bearing in the upper lateral head 18 of the carrying arm 28, which when the reeling mechanism is used in connection with the rewinding mechanism above referred to, is frictionally driven by a driving belt of said mechanism to effect a gradual rewinding of the roll of film into the upper film magazine in proper order for a succeeding exhibition.

The rewinding mechanism above referred to, consists as follows: 29 is an attaching base, which may be a wall bracket as shown, or other well known equivalent support, and which carries a vertical frame composed of three arms 30, 31 and 32. The arm 30 aforesaid is substantially horizontal and carries a transverse stud or pin 33, corresponding with the before described stud 3 of the kinetoscope, to afford pivotal support for the before described carrying arm 15 and the film magazines 12 and 13 carried thereon. The arm 31, aforesaid, is arranged vertically inclined, and is formed with a bearing hub for a transverse shaft, which in turn carries a pair of belt pulleys 34 and 35, one of which has belt connection 36 with a suitable source of motive power. Said arm also carries a centrally pivoted hand lever 37, one end of which carries a bearing roller 38, adapted to have bearing against the aforesaid arm 15 at a point below its pivotal attachment to the stud 33 aforesaid. In one position said lever is adapted to effect frictional driving engagement between the pulley 28 of the upper film magazine and the driving belt and pulley hereinafter described, and in its other position to effect a release of said frictional driving engagement. The arm 32, aforesaid, is substantially vertical and carries at its upper end a transverse shaft 39 and belt pulley 40 which is operatively connected to the aforesaid pulley 35 by an endless belt 41, as shown. In the described construction the belt 41 lies in the path of the aforesaid pulley 28 of the upper film magazine, so that in an oscillation of the same in one direction the pulley 28 is brought into frictional driving engagement with the belt 41 to be driven thereby, as above stated. 42 is a tension roller carried by a radius arm 43, pivoted on the upper end of the arm 32, aforesaid, and forced to tensioning contact with the belt 41 by a spring 44, as usual in such type of appliances. 45 is a stop lug on the arm 15 for limiting the movement of the hand lever 37, when the same is adapted to effect the before described driving engagement between the pulley 28 and belt 41. 46 is a buffer carried by the arm 15, and arranged in the path of the hand lever 37, to receive the impact of the same as it is thrown into the position which releases the engagement of the pulley 28 and belt 41 just described.

The operation of the apparatus will be readily understood from the detail description of parts above given, and a general description only is needed as follows:— With the roll of the picture film upon the reel of the upper film magazine 12, the said magazine is partly revolved to bring its film outlet neck 14 in line with the ordinary film throat of the kinetoscope, and the film threaded through said throat and onto the reel of the lower magazine 13, the neck 14 of which is automatically moved to its proper position in unison with the outlet neck 14 of the upper magazine by the intermediate link connection 21, and the magazines are locked in such position by the manually actuated spring latch bar 20, before described. With the progress of the exhibition the film is gradually wound upon the reel of the lower magazine 13 in reversed order and through the instrumentality of the before described auxiliary driving mechanism, and comprising the transverse shaft 7, pulleys 6, belt 8 and pulley 5, having frictional driving engagement with the pulley 23 of the shaft which carries the aforesaid reel of the lower film magazine 13. With the completion of the exhibition of a particular roll of film, the film is disconnected from the feeding sprocket drums and the gated guide throat of the kinetoscope, and which is termed "unthreading" in the art, after which the arm 15 and the magazines 12 and 13 carried by the same are lifted from their supporting connection with the transverse stud 3 of the kinetoscope, and replaced by a second counterpart or duplicate set of magazines and supporting arm, carrying a second roll of film, to provide for a quick change of service where two or more standard rolls of film are used at each exhibition. The supporting arm and magazines just removed and containing the roll of film in reversed order can with very little trouble or delay be placed on the rewinding mechanism by an engagement of the aforesaid supporting arm 15 on the transverse stud 33 of said mechanism, and the manual actuation of the lever 37 to cause frictional driving engagement between the belt 41 and the pulley 28 of the film reel of the upper magazine 12, to effect a rewinding of the film upon said reel in proper order for a succeeding exhibition.

Films of the standard size are usually one thousand feet in length, and at the end of each film it is preferable to use a leader of a few feet of white or undeveloped film to serve as a signal to the operator that the end of the film is at hand. With the described construction the manipulation of the aforesaid lever 37 affords a very efficient and reliable control of the rewinding operation.

Having thus fully described my said invention what I claim as new and desire to secure by Letters Patent, is:—

1. The combination of a kinetoscope, upper and lower film magazines, an intermediate arm carrying said magazines, and means for detachably mounting said arm on the frame of the kinetoscope.

2. The combination of a kinetoscope, upper and lower film magazines, an intermediate arm carrying said magazines, means for detachably mounting said arm on the frame of the kinetoscope and an operative connection between a rotating shaft of the kinetoscope and the reel-carrying shaft of the lower magazine.

3. The combination of a kinetoscope, a bracket secured to said kinetoscope, upper and lower film magazines, an intermediate arm carrying said magazines, and means for detachably securing said arm to said bracket.

4. The combination of a kinetoscope, a bracket secured to said kinetoscope, upper and lower film magazines, an intermediate arm carrying said magazines, means for detachably securing said arm to said bracket, and an operative connection between a rotating shaft of the kinetoscope and the reel-carrying shaft of the lower magazine.

5. The combination of a kinetoscope, a bracket secured to said kinetoscope, upper and lower film magazines, an intermediate arm carrying said magazines, and means for detachably securing said arm to said bracket, the same comprising a transverse stud on one part and an open recess or socket on the other part.

6. The combination of a kinetoscope, a bracket secured to said kinetoscope, upper and lower film magazines, an intermediate arm carrying said magazines, means for detachably securing said arm to said bracket, the same comprising a transverse stud on one part and an open recess or socket on the other part, and an operative connection between a rotating shaft of the kinetoscope and the reel carrying shaft of the lower magazine.

7. The combination of a kinetoscope, upper and lower film magazines, an intermediate arm carrying said magazine, means for detachably mounting said arm on the frame of the kinetoscope and an operative connection between a rotating shaft of the kinetoscope and the reel-carrying shaft of the lower magazines, the same comprising a pulley on the aforesaid shaft of the kinetoscope, a pulley carried by the kinetoscope frame, a belt connecting said pulleys, and a pulley on the reel shaft of said magazine having frictional driving engagement with said belt.

8. The combination of a kinetoscope, upper and lower film magazines, an intermediate arm carrying said magazines, means for detachably mounting said arm on the frame of the kinetoscope, and means for imparting simultaneous semi-revolution to the two magazines.

9. The combination of a kinetoscope, upper and lower film magazines, an intermediate arm carrying said magazines, means for detachably mounting said arm on the frame of the kinetoscope, an operative connection between a rotating shaft of the kinetoscope and the reel-carrying shaft of the lower magazine, and means for imparting simultaneous semi-revolution to the two magazines.

10. The combination of a kinetoscope, a bracket secured to said kinetoscope, upper and lower film magazines, an intermediate arm carrying said magazines, means for detachably securing said arm to said bracket, and means for imparting simultaneous semi-revolution to the two magazines.

11. The combination of a kinetoscope, a bracket secured to said kinetoscope, upper and lower film magazines, an intermediate arm carrying said magazines, means for detachably securing said arm to said bracket, an operative connection between a rotating shaft of the kinetoscope and the reel-carrying shaft of the lower magazine, and means for imparting simultaneous semi-revolution to the two magazines.

12. The combination of a kinetoscope, upper and lower film magazines, an intermediate arm carrying said magazines, and means for detachably mounting said arm on the frame of the kinetoscope, crank pins on the magazines and an intermediate link connected to said crank pins.

13. The combination of a kinetoscope, upper and lower film magazines, an intermediate arm carrying said magazines means for detachably mounting said arm on the frame of the kinetoscope, an operative connection between a rotating shaft of the kinetoscope and the reel-carrying shaft of the lower magazine, crank pins on the magazines, and an intermediate link connected to said crank pins.

14. The combination of a kinetoscope, a bracket secured to said kinetoscope, upper and lower film magazines, an intermediate arm carrying said magazines, means for detachably securing said arm to said bracket, crank pins on the magazines, and an intermediate link connected to said crank pins.

15. The combination of a kinetoscope, a bracket secured to said kinetoscope, upper and lower film magazines, an intermediate arm carrying said magazines, means for detachably securing said arm to said bracket, an operative connection between a rotating shaft of the kinetoscope and the reel-carrying shaft of the lower magazine, crank pins on the magazines, and an intermediate link connected to said crank pins.

16. In a rewinding mechanism for kinetoscope films, the combination of an upper and lower magazine, an intermediate arm carrying said magazines and provided with one member of a detachable connection, a stationary support provided with the companion member of the detachable connection aforesaid, a driving connection carried on said stationary support, and an operative connection between said driving connection and the reel-carrying shaft of the upper magazine.

17. In a rewinding mechanism for kinetoscope films, the combination of an upper and lower magazine, an intermediate arm carrying said magazines and provided with one member of a detachable connection, a stationary support provided with the companion member of the detachable connection aforesaid, a driving connection carried on said stationary support, and an operative connection between said driving connection and the reel-carrying shaft of the upper magazine, the same comprising in part a pair of pulleys on said stationary support, a belt connecting said pulleys, and a pulley on the reel-carrying shaft aforesaid having frictional driving engagement with said belt.

18. In a rewinding mechanism for kinetoscope films, the combination of an upper and lower magazine, an intermediate arm carrying said magazines and provided with one member of a detachable connection, a stationary support provided with the companion member of the detachable connection aforesaid, a driving connection carried on said stationary support, an operative connection between said driving connection and the reel-carrying shaft of the upper magazine, and manual means for moving said operative connection into and out of operative engagement.

19. In a rewinding mechanism for kinetoscope films, the combination of an upper and lower magazine, an intermediate arm carrying said magazines and provided with one member of a detachable connection, a stationary support provided with the companion member of the detachable connection aforesaid, a driving connection carried on said stationary support, and an operative connection between said driving connection and the reel carrying shaft of the upper magazine, the same comprising in part a pair of pulleys on said stationary support, a belt connecting said pulleys, a pulley on the reel-carrying shaft aforesaid having frictional engagement with said belt, and manual means for controlling the frictional driving engagement of the parts.

20. In a rewinding mechanism for kinetoscope films, the combination of an upper and lower magazine, an intermediate arm carrying said magazines and provided with one member of a detachable connection, a stationary support provided with the companion member of the detachable connection aforesaid, a driving connection carried on said stationary support, and an operative connection between said driving connection and the reel-carrying shaft of the upper magazine, the same comprising in part a pair of pulleys on said stationary support, a belt connecting said pulleys, a pulley on the reel-carrying shaft aforesaid having frictional driving engagement with said belt, and a lever adapted to engage and swing the magazine carrying arm and bring the pulley of the aforesaid reel-carrying shaft into frictional driving engagement with the aforesaid belt.

21. In a rewinding mechanism for kinetoscope films, the combination of an upper and lower magazine, an intermediate arm carrying said magazines and provided with one member of a detachable connection, a stationary support provided with the companion member of the detachable connection aforesaid, a driving connection carried on said stationary support, an operative connection between said driving connection and the reel-carrying shaft of the upper magazine, and a brake mechanism for retarding the rotation of the reel-carrying shaft of the lower magazine.

Signed at Chicago, Illinois, this 18th day of May 1911.

ALVAH C. ROEBUCK.

Witnesses:
ROBERT BURNS,
HENRY MOE.